June 14, 1932.  G. M. NELL  1,862,761
DRILL CHUCK
Filed Feb. 7, 1929
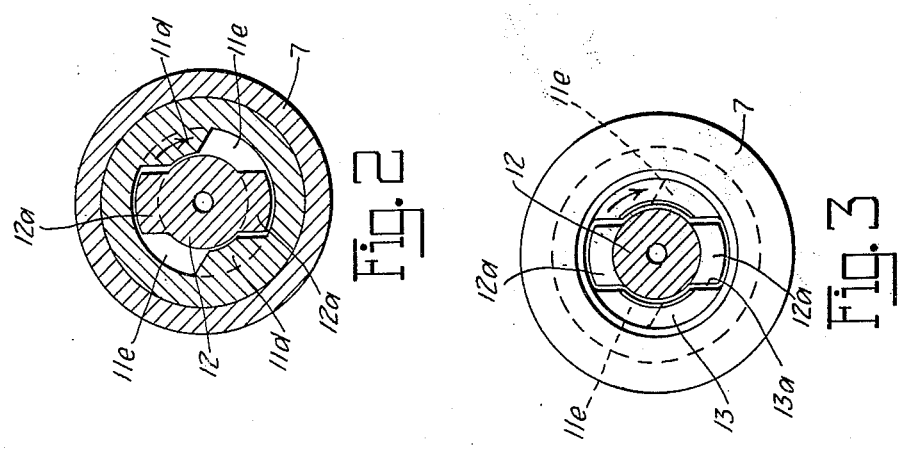
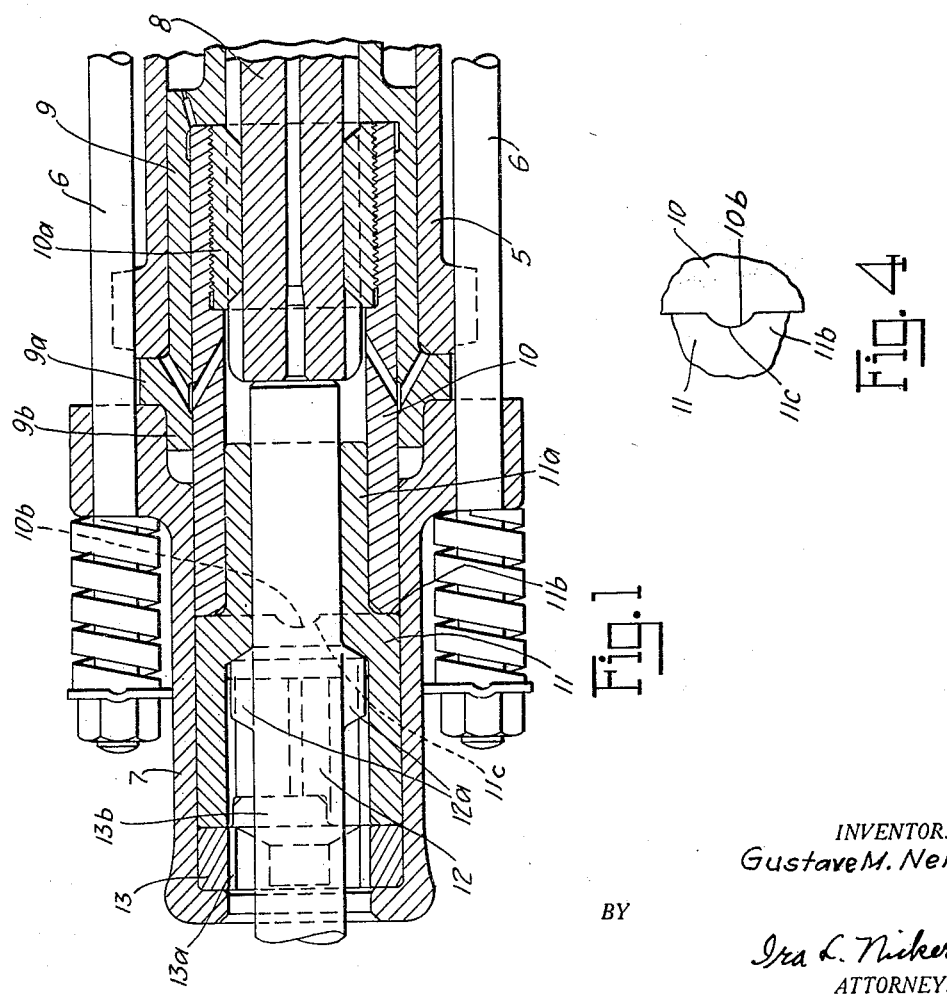
INVENTOR.
Gustave M. Nell
BY
Ira L. Nickerson
ATTORNEY.

Patented June 14, 1932

1,862,761

UNITED STATES PATENT OFFICE

GUSTAVE M. NELL, OF DETROIT, MICHIGAN, ASSIGNOR TO CHICAGO PNEUMATIC TOOL COMPANY, OF NEW YORK, N. Y., A CORPORATION OF NEW JERSEY

DRILL CHUCK

Application filed February 7, 1929. Serial No. 338,060.

This invention relates to percussive machines of the type used in rock drilling in which provision is made for the rotation of the drill steel during the reciprocations of the percussive member. More specifically it concerns the chuck in which the drill steel is supported.

One object of the invention is to devise an improved form of chuck in which those portions which wear rapidly may be easily and cheaply replaced. Another object is to so form the parts that they may be conveniently made of such material and be subjected to such heat treatment as are best suited to the functions which the parts individually perform. Another object is to improve the service and the operation of machines of the described type. Still other objects will be apparent from the detailed description which follows.

In practicing the invention the chuck proper is made in at least two parts, one of which directly engages the shank of the drill steel and takes all the wear of the latter. By preference the steel engaging part telescopes within the other and is removably secured thereto for rotative movement with the same. The securing is preferably accomplished by a pressed fit as well as a keyed connection and enables the telescoping member to serve both as a driver and a bushing and to be easily replaced when worn.

In order to illustrate the invention, one concrete embodiment thereof is shown in the accompanying drawing in which:

Fig. 1 is a longitudinal sectional view through the front end of a percussive drill;

Fig. 2 is a transverse sectional view through the front head substantially on the line 2—2 of Fig. 1;

Fig. 3 is an end elevational view of the front head showing the drill steel in section; and Fig. 4 is a fragmentary view showing the positive driving connection between the chuck sleeve and the tool receiving member.

In the illustrative disclosure of the invention, the forward end of cylinder 5 of a percussive rock drill is shown to which is secured as by the customary through rods or side bolts 6 a front head 7. Only the fluted or ribbed front end of the percussive member or piston 8 is shown which end is guided by cylinder bushing 9 which has an annular flange $9a$ clamped between cylinder 5 and front head 7 and an extension $9b$ which telescopes within a counterbored portion of front head 7.

The parts comprising the rotatable tool chuck are supported by cylinder bushing 9 and front head 7; they comprise essentially the chuck sleeve 10 and tool receiving and driving member 11. Sleeve 10, which is entirely out of contact with the drill steel or working tool 12 is journaled as indicated both in cylinder bushing 9 and front head 7. This sleeve is arranged to be rotated by any known or suitable mechanism. In the present instance it is counterbored at its rearward end and receives with a threaded connection a nut $10a$ which has grooves receiving with a sliding fit the ribs of piston 8 thereby to transmit to said sleeve any rotative movement imparted to piston 8, such as by the well-known rifle bar mechanism (not shown). The remainder or forward portion of sleeve 10 is of uniform size with a smooth cylindrical internal surface. The main portion of tool receiving member 11 is journaled in front head 7 but it has a reduced cylindrical extension $11a$ of uniform size with a smooth external surface which telescopes within sleeve 10 and serves as a bushing for the latter. The shoulder $11b$ formed by reduced extension $11a$ abuts the front end of sleeve 10. Member 11 is secured to sleeve 10 in such a manner as to rotate with the latter but to be conveniently removable for replacement when worn.

By preference extension $11a$ has a pressed fit within sleeve 10 and a positive driving connection is additionally provided by any suitable keyed or tooth connection. In the form shown, interengaging means are provided on shoulder $11b$, on the front end of sleeve 10, such means consisting of one or more low rounded projections or teeth $10b$ on sleeve 10 received and fitting in suitable sockets $11c$ on member 11 (Figs. 1 and 4).

Chuck member 11 alone is engaged by drill steel 12 and performs the dual function of a bushing for the extreme inner end of the steel and as a driver for the steel. In consequence it takes all of the wear to which the drilling machine is subjected through actual contact with the drill steel. In the present instance the drill steel 12 is provided with diametrically opposite lugs 12a spaced a suitable distance from the end of the steel as shown and the bore of member 11 is arranged to conform thereto; thus the reduced portion 11a receives only the rearmost part of the shank of the steel and serves as a bushing for the latter while the bore the large portion is shaped to receive lugs 12a and provides internal abutments 11d (Fig. 2) to engage lugs 12a to rotate the steel, the direction of rotation of member 11 being indicated by the arrow (Fig. 2). If desired a chuck key 13 may be provided in the outer end of the front head 7 having an opening 13a (Fig. 3) to permit insertion longitudinally of the drill steel and keyed to member 11 by any suitable means such as one or more projections 13b. (Fig. 1). With this arrangement, on insertion of the drill steel a slight rotation in a counter clockwise direction (Figs. 2 and 3) will cause the lugs 12a of the steel to enter spaces 11e in member 11 forming a bayonet type lock in the usual manner.

From the above it will be apparent that to renew the chuck on account of wear produced by the drill steel, it is only necessary to replace a single member, namely the combined bushing and driver member 11. It is further apparent that with this arrangement member 11 may be conveniently made of different material and subjected to different heat treatment than the other members of the drilling machine so that it may better perform its functions. Moreover, by the interfitting bearing arrangement and the tight press fit of sleeve 10 and member 11, the same rigidity and fixed alignment is secured as if the parts were integrally united or made as a single piece.

While the invention has been herein disclosed in what is now considered to be a preferred form, it is to be understood that the invention is not limited to the specific details thereof but covers all changes, modifications, and adaptations within the scope of the appended claims.

I claim as my invention:

1. Chuck mechanism for percussive drilling machines comprising a rotatable sleeve having a smooth cylindrical internal surface of uniform size, a driver member for receiving the drill steel and for taking the wear of the latter, said member having a part for end engagement with said sleeve and an extended reduced cylindrical portion of uniform size with a smooth exterior to telescope within said sleeve and to engage the same with a press fit, and means on the end engaging parts of said sleeve and member comprising a low rounded projection on said sleeve fitting a cooperating recess or socket in said member, the interfitting arrangement and the press fit of the telescoping portions operating to maintain the engaging parts in rigid and fixed alignment.

2. In a percussive drill using lugged steel, in combination, a cylinder, a front head, a bushing having telescoping engagement with both said cylinder and front head, a chuck sleeve journaled in said bushing and front head, a nut threaded into said sleeve at its rearward end, said sleeve forwardly of said nut having a smooth cylindrical interior surface of uniform dimension, a driver member journaled in said front head and having a reduced cylindrical extension of uniform size with a smooth exterior telescoped into said chuck sleeve with a tight press fit, said reduced telescoping portion of said member serving as a bushing for the shank of the drill steel and the portion journaled in said front head having internal abutments to engage the lugs in the steel, and positive driving means in the abutting parts of said sleeve and member comprising a low rounded portion on one fitting a cooperating recess or socket in the other.

Signed by me at Detroit, in the county of Wayne, and State of Michigan, this 2nd day of February, 1929.

GUSTAVE M. NELL.